(12) United States Patent
Floeter et al.

(10) Patent No.: US 7,118,773 B2
(45) Date of Patent: Oct. 10, 2006

(54) EDIBLE SPREAD CONTAINING A NATURAL FAT PHASE

(75) Inventors: Eckhard Floeter, Vlaardingen (NL); Henricus Arnoldus Hendrickx, Vlaardingen (NL); Cornelis Willem van Oosten, Vlaardingen (NL); Cornelis Sjouke Stellema, Vlaardingen (NL)

(73) Assignee: Lipton, divison of Conopco, Inc., Englewood Cliffs, NJ (US)

( * ) Notice: Subject to any disclaimer, the term of this patent is extended or adjusted under 35 U.S.C. 154(b) by 206 days.

(21) Appl. No.: 10/043,823

(22) Filed: Nov. 20, 2001

(65) Prior Publication Data

US 2002/0122868 A1 Sep. 5, 2002

(30) Foreign Application Priority Data

Nov. 21, 2000 (EP) ................................. 00204120
May 21, 2001 (EP) ................................. 01201916

(51) Int. Cl.
A23D 7/00 (2006.01)

(52) U.S. Cl. ...................................... 426/603; 426/607
(58) Field of Classification Search ................ 426/601, 426/603, 607
See application file for complete search history.

(56) References Cited

U.S. PATENT DOCUMENTS

| | | | | |
|---|---|---|---|---|
| 4,348,423 A | * | 9/1982 | Pairaud et al. | 426/607 |
| 4,388,339 A | * | 6/1983 | Lomneth et al. | 426/602 |
| 4,390,561 A | * | 6/1983 | Blair et al. | 426/607 |
| 4,447,462 A | | 5/1984 | Tafuri et al. | |
| 4,568,556 A | | 2/1986 | McCoy | |
| 4,877,636 A | * | 10/1989 | Koyano et al. | 426/607 |
| 4,910,037 A | * | 3/1990 | Sagi et al. | 426/601 |
| 5,424,091 A | * | 6/1995 | Cain et al. | 426/610 |
| 5,679,393 A | * | 10/1997 | Laur et al. | 426/417 |
| 5,786,019 A | | 7/1998 | Cain et al. | |
| 6,475,548 B1 | | 11/2002 | Bons et al. | |
| 6,756,070 B1 | | 6/2004 | Milley | |
| 6,777,018 B1 | | 8/2004 | Floeter et al. | |
| 2002/0114874 A1 | * | 8/2002 | Floeter et al. | 426/602 |
| 2002/0122866 A1 | * | 9/2002 | Palaniappan et al. | 426/599 |

FOREIGN PATENT DOCUMENTS

| | | |
|---|---|---|
| BE | 904 628 | 8/1986 |
| EP | 0 185 524 | 6/1986 |
| EP | 0 294 974 | 12/1988 |
| EP | 0 321 227 | 6/1989 |

OTHER PUBLICATIONS

Adomako 1977. J. Sci. Fd. Agric 1971, 28:384-386..*
International Search Report on PCT/EP 01/12272 dated Apr. 10, 2002.
European Search Report on Application No. EP 00 20 4120 dated Apr. 20, 2001.
Foma et al., *Kemel oils seven plant species of zaire,* JOAOCS, vol. 62, No. 5, 1985, pp. 910-911.
International Search Report on PCT/EP 01/12273 dated Apr. 3, 2002.
Co-pending application for Floeter; Serial No. 10/442,766; dated May 21, 2003 for "Triglyceride Fat".
Oil Crops Monograph from Internet Accessed, Jun. 6, 2005.
Bailey's Industrial Oil and Fat Products, edited by Daniel Swern, 1964, pp. 7-12.

* cited by examiner

*Primary Examiner*—Carolyn Paden
(74) *Attorney, Agent, or Firm*—Gerard J. McGowan, Jr.

(57) ABSTRACT

Edible W/O emulsion spread comprising a continuous fat phase which contains a natural structuring hardstock fat, which hardstock fat contains at least 45 wt. % of SOS triglyceride (S is C18-C24 fatty acid residue and 0 is an oleic acid residue). A fat with such composition may be isolated from plants belonging to the genus Allanblackia or the genus Pentadesma.

8 Claims, No Drawings

EDIBLE SPREAD CONTAINING A NATURAL FAT PHASE

The present invention deals with an edible emulsion spread containing a natural fat phase and a process for its preparation.

BACKGROUND AND PRIOR ART

Butter is an edible emulsion spread consisting of a continuous fat phase and an aqueous phase which is dispersed as fine droplets in the fat phase. The fat phase consists of dairy fat, a 100% natural fat. Margarine too is a fat continuous emulsion, but margarine fat is not natural, but has been processed in order to give margarine properties desired for a spread. The fat phase of margarine and of similar fat continuous emulsion spreads is a mixture of a fat which is fully liquid (the oil part of the fat phase) and a fat which is solid at ambient temperature.

The solid fat, denoted as hardstock fat, serves to structure the fat phase and helps to stabilize the emulsion. For imparting to common margarine a semi-solid, plastic, spreadable consistency this stabilizing and structuring functionality plays an important role. The crystals of the solid fat form a network throughout the liquid oil resulting into a structured fat phase. The aqueous phase droplets are fixed within the spaces of the lattice of solid fat crystals. In this way coalescence of the droplets and separation of the heavier aqueous phase from the fat phase is prevented.

The technology of spread processing is well established. The type of fat and the ratio of liquid oil and solid fat are chosen such that after proper processing of the fat blend with an aqueous phase a plastic product with a suitable consistency and mouthfeel is obtained.

Vegetable oils are the usual source for preparing margarine fats. Vegetable fats are preferred over animal fats because their unsaturated fat composition enhances the spread's nutritional value. Besides that, vegetable fats are an abundant and relatively cheap resource. However, natural, non-processed vegetable fats which are suited as hardstock fat are rather rare.

Fractionation, hydrogenating and interesterification are the normally used treatments for turning liquid vegetable oils into suitable hardstock fats.

The present trend in food processing is to avoid processing, particularly chemical processing as much as possible and to opt for natural ingredients and natural processing. Natural means that the ingredients have a natural origin and after harvesting have been subjected to no other treatment than a refining or purification treatment and to no modification treatment whatsoever. This trend strongly appeals to present consumer appreciation. It also may contribute to the economy of the production process.

Generally, fats with a high content of HUH triglycerides show good structuring properties. H denotes a C16–C24 saturated fatty acid residue, such as palmitic acid (C16) or stearic acid (C18) and U denotes an unsaturated C18 fatty acid residue, such as oleic acid (C18:1) or linoleic acid (C18:2).

Cocoa butter is the only unprocessed fat which contains a high amount of HUH triglycerides and which has been used for margarine production. However, use of cocoa butter as hardstock fat for spread preparation entails serious disadvantages. Cocoa butter has a natural high content of palmitic acid. Palmitic acid has a well established negative effect on blood cholesterol level. Food containing a high palmitic acid content may contribute to increased incidence of cardiovascular disease. Further cocoa butter in its main application, chocolate manufacture, suffers from severe re-crystallisation phenomena, which is known as fat blooming. Similar defects are feared in spread preparation which would easily spoil the product's consistency.

Finally, cocoa butter is generally too expensive to serve as hardstock fat in margarine manufacture.

Shea fat, also having a high content of HUH triglycerides, ail needs to be fractionated before use, because it contains up to 10 wt. % of non-saponifiable matter. The stearin contains 73 wt. % of HUH where nearly all H are stearic acid residues and nearly all U are oleic acid residues. The high costs of fractionation are prohibitive for the commercial use of shea stearin in spread manufacture. Natural, non-processed hardstock fats with a high content of HUH in which H mainly is a stearic acid residue are still much sought ingredients for the manufacture of emulsion spreads with a wholly natural fat phase. The present invention satisfies the need of a natural non-processed hardstock fat with such triglyceride content.

SUMMARY OF THE INVENTION

The present invention is based on the discovery of vegetable fats which have such beneficial triglyceride composition that they can be used as such as a natural hardstock fat for spread manufacture. Those fats do not need any modification after refining. The fats are known under the names Allanblackia fat and Pentadesma fat. They contain a high StOSt content: about 65 wt. % of the triglycerides of Allanblackia fat and about 48 wt. % of the triglycerides of Pentadesma fat is StOSt, where St is a stearic acid residue and O is an oleic acid residue.

The present invention provides an edible W/O emulsion spread comprising 70–20 wt. % of an aqueous phase dispersed in 30–80 wt. % of a fat phase which fat phase is a mixture of 50–99 wt. % of a vegetable triglyceride oil A and 1–50 wt. % of a structuring triglyceride fat B, which fat consists of 5–100 wt. % of a hardstock fat C and up to 95 wt. % of a fat D, characterized in that at least 45 wt. % of the hardstock fat C triglycerides consist of SOS triglycerides, where S denotes a fatty acid residue with a saturated C18-C24 carbon chain and O denotes an oleic acid residue and with the proviso that any hardstock fat C which has been obtained by fractionation, hydrogenation, esterification or interesterification of the fat is excluded.

The invention further provides a process for the preparation of such edible W/O emulsion spreads.

DETAILS OF THE INVENTION

The present invention relates to edible emulsion spreads, particularly to fat continuous emulsion spreads such as margarine. The invention can be generally used for the manufacture of common fat continuous spreads irrespective of their fat content.

Allanblackia fat is denoted with a variety of indigenous names including Sonkyi fat. It is harvested from the African plant Allanblackia of which several species such as *A. floribunda* and *A. stuhlmannii* are known. Allanblackia belongs to the subfamily Clusioideae, which is part of the family Guttiferae. All species share a substantially common fatty acids pattern and triglyceride composition. Allanblackia fat had found some early employment as an ingredient in chocolate manufacture (EP 321227) and in the soap industry (J.Am.Oil Chem.Soc.,62, no.5, 1985, pp. 910–911), but it has never been considered for use in the manufacture of fat continuous emulsion spreads.

Pentadesma fat is also obtained from an African plant, the tree Pentadesma butyracea. The suggested use of the oil is for soap manufacture. It has never been considered as an ingredient for margarine manufacture.

We have found that both fats are ideal hardstock fats for margarine manufacture. After refining no modification processing is necessary. By admixture with a liquid oil a fat phase is obtained which shows the steep melting curve desired for margarine fat. A spread prepared with such fat phase preserves its solid consistency in the range of refrigerator temperature up to ambient or even slightly elevated temperatures, while when swallowed it gives a pleasant quick melting sensation in the mouth.

Allanblackia fat has a high (60–80 wt. %) content of SOS triglycerides, a low SSS content and the remainder of the fat mainly consisting of SOO.

With a content of 48 wt. % StOSt also Pentadesma fat without modification can be used as a hardstock fat.

A natural fat containing at least 45 wt. % of SOS triglycerides is a much desired hardstock fat. Until now no method is known for realizing production of such fats without a modification treatment. Fractionation was inevitable in order to increase the SOS content.

Most preferably, fat B of the present fat phase consists fully of the natural hardstock fat C containing at least 45 wt. % SOS. However, up to 95 wt. %, preferably only up to 50 wt. % of fat C may be substituted by another fat D. This fat might have structuring properties of itself. Generally, besides the hardstock fat C, any fat D may be present which does not adversely affects the quality of the final spread product and which together with fat C provides sufficient structuring functionality to fat blend B. Suitable fats D are palm oil, palm kernel fat, coconut fat, babassu fat, shea fat and their fractions. Fats D may have been subjected by enzymatic rearrangement. Like fat C, preferably fat D too qualifies as a natural fat, so that the spread's fat phase can qualify as natural. Preferably, the unmodified high-SOS hardstock fat C consists of Allanblackia fat and/or Pentadesma fat or a mixture of both.

The invention further provides a process for the preparation of said edible W/O emulsion spread which comprises the steps emulsifying 70–20 wt. % of an aqueous phase with 30–80 wt. % of a fat phase which is a mixture of 50–99 wt. % of a vegetable oil A and 1–50 wt. % of a structuring fat B consisting of fat C and optional fat D as defined in claim 1, cooling and working the emulsion to obtain a spreadable emulsion, characterized in that at least 45 wt. % and preferably at least 50 wt. % of the triglycerides of fat C consist of SOS triglycerides and with the proviso that use of a fat C which has been obtained by fractionation, hydrogenation, esterification or interesterification of the fat is excluded.

The invention excludes the use of hardstock fats C which have been obtained by fractionation, hydrogenation, esterification or interesterification and, more generally, hardstock fats are excluded which have been obtained by other processing than a refining or purification treatment.

The liquid oil of the fat phase may be any liquid vegetable oil and suitably the fat phase is prepared with one or more of the common commodity oils chosen from the group consisting of: rapeseed oil, sunflower oil, cottonseed oil, soybean oil, olive oil and mixtures of those oils. Natural refining processes are readily available.

Generally, a blending ratio of 30 wt. % of structuring fat B and 70 wt. % of liquid oil A affords a suitable margarine fat phase. A fat phase when prepared for example with 30 wt. % of unprocessed Allanblackia fat and 70 wt. % of rapeseed oil contains only 22 wt. % (on total fat phase) of saturated fatty acids (SAFA) which is a fine value from a nutritional point of view.

A proper amount of hardstock fat depends on the type of spread. The composition of a wrapper margarine requires more solid fat than that of a tub margarine to obtain the desired consistency. On the other side relatively more hardstock is necessary when it contains a small amount of structuring triglycerides such as StOSt.

Although the spreads of the invention are said to be prepared with a vegetable fat phase, the invention also comprises spreads where a part of the fat phase has been substituted by dairy fat.

The aqueous phase may contain the usual spread ingredients comprising water, emulsifiers, gelling and/or thickening agents, salt, colouring agents, flavours, preservation agents and dairy proteins.

The aqueous phase may also contain a dispersed fat phase so that eventually an O/W/O-emulsion would result which is a subspecies of the spreads according to the present invention.

For the preparation of the spread use is made of common spread manufacturing technology: The aqueous phase and the fat phase are prepared by mixing the respective ingredients. Then both phases are emulsified. The crude pre-emulsion is subjected to the usual cooling and working treatments employing scraped surface heat exchangers and pin stirrers so that eventually a plastic spread product is obtained. This established technology is well known to the man skilled in the art. Details can be found in various textbooks such as K. A. Alexandersen, Margarine Processing Plants and Equipment (Vol.4, Bailey's Industrial Oil and Fat Products, Wiley and Sons Inc., New York 1996).

Preferably the invented spread is prepared with only natural ingredients.

EXAMPLE

Allanblackia floribunda fat was purified under standard refining conditions. A spread according to the invention was prepared using the fat blend of Table 1 for preparing a pre-emulsion according to Table 2. The pre-emulsion was processed in a A-A-C line under the conditions listed in Table 3. An assay of the resulting spread is shown in Table 4. The product is easily spreadable from the refrigerator. The spread shows a steep melting line which causes a very pleasant mouthfeel. The hardness values point to good ambient stability.

TABLE 1

| Fat blend | wt. % |
|---|---|
| Rapeseed oil | 70 |
| Allanblackia | 30 |
| SOS | 21 |
| SOO | 12 |
| SOS/SLS | 78 |
| total SAFA | 22 |
| Solid fat | |
| N5 | 24.5 |

TABLE 1-continued

| Fat blend | wt. % |
|---|---|
| N10 | 22.4 |
| N15 | 20 |
| N20 | 16 |
| N25 | 11.4 |
| N30 | 5.3 |
| N35 | 0 |

TABLE 2

| Pre-emulsion | wt. % |
|---|---|
| Fat blend | 80 |
| Bolec ZT | 0.32 |
| Hymono 8903 | 0.035 |
| Flavour | trace |
| B-carotene | 0.048 |
| Water | 18.6 |
| K-sorbate | 0.073 |
| Whey protein | 0.55 |
| Salt | 0.28 |
| Citric acid | 0.05 |
| End pH | 4.6 |

TABLE 3

Process settings:
Premix 60° C., pump 4.45 kg/h, pressure 8 bar

|  |  | A-unit 1 | A-unit 2 | C-unit |
|---|---|---|---|---|
| Temp in | ° C. | 44 | 17 | 12 |
| Temp out | ° C. | 17 | 12 | 14 |
| Volume | ml | 18.3 | 18.3 | 150 |
| rpm | /min | 600 | 600 | 200 | direct storage: 15° and 5° C.

TABLE 4

Stevens 4.4 hardness (g) of spread

| C. | 1 week | 2 weeks | 4 weeks | 9 weeks |
|---|---|---|---|---|
| 5° | 70 | 67 | 60 | 56 |
| 15° | 62 | 70 | 86 | 94 |
| 20° | 60 | 76 | 82 |  |

The invention claimed is:

1. An edible W/O emulsion spread comprising 70–20 wt. % of an aqueous phase dispersed in 30–80 wt. % of a fat phase which fat phase is a mixture of 50–99 wt. % of a vegetable triglyceride oil A and 1–50 wt. % of a structuring triglyceride fat B, which fat consists of 5–100 wt. % of a hardstock fat C and up to 95 wt. % of a fat D, where at least 45 wt. % of the hardstock fat C triglycerides consist of SOS triglycerides and where S denotes a fatty acid residue with a saturated C18–C24 carbon chain and O denotes an oleic acid residue and with the proviso that any hardstock fat C which has been obtained by fractionation, hydrogenation, esterification or interesterification of the fat is excluded.

2. A spread according to claim 1, where a hardstock fat C which has been subjected to other processing than a refining or purification treatment is excluded.

3. A spread according to claim 1, where at least 50 wt. % of the triglycerides of the hardstock fat C consist of SOS triglycerides.

4. A spread according to claim 1, where the triglyceride fat B consists of 50–100 wt. % of hardstock fat C and up to 50 wt. % of fat D.

5. A spread according to claim 1, where the triglyceride fat B fully consists of hardstock fat C.

6. A spread according to claim 1, where the hardstock fat C consists of Allanblackia fat or Pentadesma fat or a mixture of both.

7. A process for the preparation of an edible W/O emulsion spread comprising the steps emulsifying 70–20 wt. % of an aqueous phase with 30–80 wt. % of a fat phase which is a mixture of 50–99 wt. % of a vegetable oil A and 1–50 wt. % of a structuring fat B consisting of fat C and fat D as defined in claim 1, cooling and working the emulsion to obtain a spreadable emulsion, where at least 45 wt. % of the triglycerides of fat C consist of SOS triglycerides and with the proviso that use of a fat C which has been obtained by fractionation, hydrogenation, esterification or interesterification of the fat is excluded.

8. A process according to claim 7, where use of a fat C which has been subjected to other processing than a refining or purification treatment is excluded.

* * * * *